United States Patent [19]

Login et al.

[11] Patent Number: 5,219,950
[45] Date of Patent: Jun. 15, 1993

[54] METHOD OF CROSSLINKING PVP

[75] Inventors: Robert B. Login, Oakland; Jenn S. Shih, Paramus; Jui-Chang Chuang, Wayne, all of N.J.

[73] Assignee: ISP Investments Inc., Wilmington, Del.

[21] Appl. No.: 945,565

[22] Filed: Sep. 16, 1992

[51] Int. Cl.⁵ .................. C08C 19/32; C08C 19/38; C08F 26/08; C08F 26/10
[52] U.S. Cl. .............. 525/359.3; 525/328.2; 525/328.7; 525/328.8; 525/355; 525/385; 526/307.5; 526/312
[58] Field of Search ............ 525/359.3, 385; 526/264, 307.5

[56] References Cited

U.S. PATENT DOCUMENTS

| | | | |
|---|---|---|---|
| 3,178,397 | 4/1965 | Olaj | 526/240 |
| 3,563,968 | 2/1971 | Merijan | 526/227 |
| 4,086,238 | 4/1978 | Krenzer | 548/137 |
| 4,605,701 | 8/1986 | Harada | 525/107 |
| 4,692,328 | 9/1987 | Kitchell | 424/78 |
| 5,073,614 | 12/1991 | Shih | 526/258 |

*Primary Examiner*—Joseph L. Schofer
*Assistant Examiner*—Fred Zitomer
*Attorney, Agent, or Firm*—Walter Katz; Marilyn J. Maue; Joshua J. Ward

[57] ABSTRACT

The method of crosslinking polyvinylpyrrolidone (PVP) which comprises: copolymerizing vinyl pyrrolidone (VP) and an aminoalkene, a hydroxyalkene, or an aminoalkyl acrylamide or methacrylamide, to provide a crosslinkable, functional PVP copolymer as a starting material; then (a) condensing predetermined amounts of the starting material and a haloacetal under basic conditions to form a stable, crosslinkable PVP copolymer intermediate containing an acetal group as a functional appendant on the PVP polymer backbone; (b) acidifying the basic solution to hydrolyze the acetal group to an aldehyde group, and (c) crosslinking the aldehyde-functional PVP copolymer with the amine group of the amine-functional PVP copolymer, present on the polymer as free amine after step (a), or as added amine-functional copolymer to the reaction mixture, under basic conditions.

5 Claims, No Drawings

METHOD OF CROSSLINKING PVP

CROSS-REFERENCE TO RELATED U.S. PATENT APPLICATIONS

U.S. Pat. applications Ser. Nos. 879,411, filed May 6, 1992 and 888,998, filed May 26, 1992, by the same inventors as herein, and assigned to the same assignee, described and claimed the starting materials used in this invention.

BACKGROUND OF THE INVENTION

1. Field of the Invention

This invention relates to a method for making crosslinked vinyl lactam polymers, e.g. crosslinked polyvinylpyrrolidone (PVP) and, more particularly, to crosslinking, by reaction in solution between a stable, crosslinkable PVP copolymer and a functional PVP copolymer at a predetermined pH.

2. Description of the Prior Art

Merijan, in U.S. Pat. No. 3,563,968, described the preparation of functional graft homopolymers of vinyl lactams, e.g. vinyl pyrrolidone, by reaction of polyvinylpyrrolidone with allyl amine or allyl alcohol in ethanol solvent in a bomb reactor at 130°–140° C.

Kitchell, in U.S. Pat. Nos. 4,692,328 and 4,772,484, disclosed the chemical crosslinking reaction of functional graft homopolymers of vinyl pyrrolidone with glutaraldehyde to form a gel which was useful in biological applications.

PVP and PVP copolymers also have been physically crosslinked using E-beam or gamma radiation.

However, it would be of advantage to provide a simple method of crosslinking a stable, crosslinkable vinyl lactam polymer, at a predetermined pH, without requiring condensation with glutaraldehyde, or the use of expensive radiation equipment.

SUMMARY OF THE INVENTION

The method of crosslinking polyvinylpyrrolidone (PVP) which comprises: copolymerizing vinyl pyrrolidone (VP) and an aminoalkene, a hydroxyalkene, or an aminoalkyl acrylamide or methacrylamide, to provide a crosslinkable, functional PVP copolymer as a starting material; then (a) condensing predetermined amounts of the starting material and a haloacetal under basic conditions to form a stable, crosslinkable PVP copolymer intermediate containing an acetal group as a functional appendant on the PVP polymer backbone; (b) acidifying the basic solution to hydrolyze the acetal group to an aldehyde group, and (c) crosslinking the aldehyde-functional PVP copolymer with the amine group of the amine-functional PVP copolymer, present on the polymer as free amine after step (a), or as added amine-functional copolymer to the reaction mixture, under basic conditions.

DETAILED DESCRIPTION OF THE INVENTION

Suitable starting materials in the process of this invention are stable crosslinkable PVP copolymers containing a functional group such as an amine or hydroxyl group. Accordingly, suitable starting materials are amino- or hydroxy-functional vinyl pyrrolidone (VP) copolymer, which are prepared by solution copolymerization of VP and a functional-group containing polymerizable monomer, e.g. an olefinic amine, such as allyl amine (AAm), or a hydroxyalkene, e.g. allyl alcohol (AA), in a suitable solvent, e.g. water. Typical process parameters for carrying out this polymerization are given in Table 1 below, where the defined ranges are given in parts by weight.

TABLE 1

| | | Reaction Conditions | |
|---|---|---|---|
| Parameter | Suitable | Preferable | Most Preferable |
| Wt. Ratio of VP/allyl amine or allyl alcohol | 99/1–1/1 | 97/3–70/30 | 95/5–80/20 |
| % Initiator (based on total wt. monomers) | 0.2–10 | 0.2–5 | 0.2–2 |
| Temp (°C.) | 20–130 | 40–80 | 50–70 |
| Pressure (atm) | 1–5 | 1–3 | 1–2 |
| % Solids in Product | 5–50 | 10–40 | 20–30 |

The preparation of such amino- or hydroxy-functional VP polymers is described in Examples 1–4 below.

EXAMPLES 1–4

Preparation of VP/AAm and AA Polymers

A 1-liter, 4-necked reaction kettle equipped with a dry ice/acetone condenser, a mechanical stirrer, a nitrogen purge adaptor, and a thermocouple connected to a temperature controller was charged with predetermined amounts of deionized water, vinyl pyrrolidone and allyl amine or allyl alcohol (see Table 2 below).

The charged reactor was heated to a reaction temperature during a period of 30 minutes with a nitrogen purge being maintained throughout the process. Thereafter, the reactor was maintained at the reaction temperature for another 30 minutes while 520 microliters of t-butylperoxypivalate (Lupersol 11, 75% active, Atochem NA) was added. The polymerization was carried out during a period of 16 hours. Then an additional 200 ml of distilled water was added to the reaction product and a mixture of water and unreacted allyl amine or allyl alcohol was distilled off. The reactor then was cooled to room temperature and its contents were poured into a thin pan container. The liquid was freeze-dried overnight and thereafter dried in a vacuum oven at 90° C. The product was a powder of the functional polymer of VP and allyl amine or allyl alcohol having the properties given in Table 2 below.

TABLE 2

| | Reaction Conditions | | | | Properties of Product | | | |
|---|---|---|---|---|---|---|---|---|
| Ex. No. | Vinyl pyrrolidone (g) | Allyl amine (g) | Allyl alcohol (g) | Water (g) | Temp (°C.) | *K-Value | Tg (°C.) | Functional —NH$_2$ (meq NH$_2$/g) |
| 1 | 90 | 10 | — | 300 | 65 | 34.5 | 126 | 0.412 |
| 2 | 90 | 10 | — | 450 | 130 | 33.3 | 117 | 0.486 |
| 3 | 90 | — | 10 | 300 | 65 | 36.3 | 131 | — |
| 4 | 90 | — | 10 | 300 | 130 | 32.5 | 129 | — |

*Fikentscher K value

Another suitable starting material for use in the crosslinking method of the invention is a functional copolymer of vinyl pyrrolidone and an amino alkyl acrylamide (AAAM), e.g. N-(3-aminopropyl)acrylamide (AAAM) or methacrylamide (APMAM), in an amount which provides a functional polymer in the compositional ratio of about 90–99.7% VP to about 0.3–10% APMAM.

The VP/APMAM polymers also are preferably prepared by solution polymerization of the monomers in water, as shown in Examples 5-9 below.

EXAMPLES 5-9

Preparation of VP/APMAM Polymers

In a 1-liter, 4-necked reaction kettle equipped with a condenser, a mechanical stirrer, a dropping funnel, a nitrogen purge adaptor, and a thermocouple connected to the temperature controller, 500 g. of deionized water and a predetermined amount of vinyl pyrrolidone (see Table 3 below) were charged. The reactor was heated to 65° C. in 30 minutes with nitrogen purge throughout the entire process. The reactor temperature was held at 65° C. for another 30 minutes. The desired amount of N-(3-aminopropyl)methacrylamide hydrochloride (APMAM-HCl) (Eastman-Kodak) was dissolved in 10 9. of deionized water and the solution was adjusted to pH 8 by adding ammonium hydroxide solution. Then 520 microliters of t-butylperoxypivalate (Lupersol 11) was added and the APMAM solution was fed into reactor over one hour. After the addition, the reaction temperature was increased to 80° C. during 30 minutes and the temperature was held for another 30 minutes. The reactor was cooled to room temperature and the contents were poured into a shallow pan. The polymer produced was freeze-dried overnight and dried in a vacuum oven at 90° C. The results are shown in Tables 3 and 4 below.

TABLE 3

| Ex. No. | Reaction Mixture | | |
|---|---|---|---|
| | VP (g) | APMAM-HCl (g) | APMAM (g) |
| 5 | 90 | 10 | 8.0 |
| 6 | 98 | 2 | 1.6 |
| 7 | 99 | 1 | 0.8 |
| 8 | 99.5 | 0.5 | 0.4 |
| 9 | 99.75 | 0.25 | 0.2 |

TABLE 4

| Ex. No. | Physical Properties of the Polymer | | |
|---|---|---|---|
| | VP/APMAM | K-Value | Resid. VP (%) |
| 7 | 99/0.8 | 79 | 0.35 |
| 8 | 99.5/0.4 | 84.7 | 0.04 |
| 9 | 99.75/0.2 | 70.1 | 0.31 |

CROSSLINKING PROCESS OF INVENTION

1. In Situ Embodiment

The so-called "in situ" embodiment of the process of the invention, is characterized by the use of less than one equivalent of haloacetal in step (a) below per mole of starting material, which provides a predetermined amount of free amine functionality on the PVP copolymer, for crosslinking in step (c) below. The sequence of process steps is illustrated below using an amino-functional PVP copolymer as the starting material.

IN SITU METHOD OF CROSSLINKING PVP

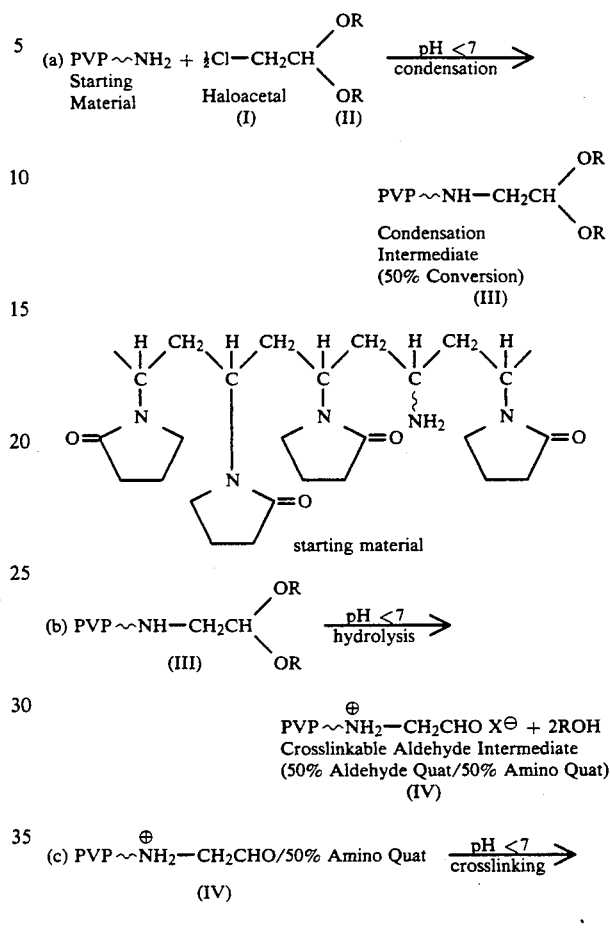

Step (a)

In accordance with the "in situ" embodiment of the method of the invention, in step (a), the amino-functional PVP copolymer starting material (I) is reacted with less than one equivalent of a haloacetal, e.g. a ½ equivalent of chloroacetal (II), where R is a $C_1$-$C_6$ alkyl group, at a pH>7, to form a 50% crosslinkable acetal-functional PVP polymer intermediate (III). The reaction mixture also includes a 50% equivalent of free amine on the copolymer. This condensation reaction suitably is carried out in a solvent, e.g. aqueous and alcoholic solvents, such as water, methanol, or ethanol, or mixtures thereof, at a temperature of from about 60° C. to reflux, and for a reaction period of about 5-7 hours. The product of this reaction is a stable mixture of crosslinkable intermediate (III) which includes free amine groups on the copolymers.

Steps (b) and (c)

The desired crosslinking of (III) with (I) then is carried out conveniently by addition of a suitable amount of an acid until the solution pH<7. In such acid solution, (III) is successively hydrolyzed and crosslinked, process steps (b) and (c). During step (b), the acetal-functional PVP polymer intermediate (III) is hydrolyzed at pH<7 to form an aldehyde-functional PVP polymer (IV). This reaction also is carried out in a solvent, e.g. water, methanol or ethanol. In step (c), the aldehyde-functional PVP polymer (IV) is condensed under basic conditions with free amino-functional groups on the copolymer to form the desired crosslinked PVP polymer (V). The "in situ" embodiment of the invention will now be illustrated in Example 10.

EXAMPLE 10

Preparation of Aqueous Solution of Amino-Functional PVP Polymer Starting Material A 4-neck, 5-liter round bottom glass flask equipped with a heating mantle, mechanical agitator, condenser, thermowell, thermometer and a 3-liter graduated pressure equalizing dropping funnel is charged with a heel mixture of 105 grams of vinyl pyrrolidone (VP), 2.85 grams of allylamine, and in 217 grams of distilled water. The dropping funnel is charged with an aqueous mixture of 951 grams of VP, 25.65 grams of allylamine, 0.4 grams of tertiary-amyl peroxypivalate (tAPP) in 1,952 grams of distilled water. The heel and the aqueous contents of the dropping funnel are sparged with $N_2$ for ½ hour. The heel is agitated and heated to 65° C. at which point 0.1 grams of tAPP is added to the heel charge and the charge in the dropping funnel is immediately added over four hours while maintaining temperature and a $N_2$ blanket. Then heating is continued for another hour and 0.1 g of tAPP is added again every hour until the residual VP monomer level is below 0.05%. The product obtained is a copolymer of 95 mole % VP and 5 mole % allylamine as a 34% aqueous solution.

Step (a)

A 2-liter, 3-neck round bottom flask equipped with a mechanical stirrer, thermometer, thermowell and condenser is charged with 1,000 grams of the aqueous polymer solution prepared above. Then 9.55 grams of chloroacetaldehyde dimethylacetal is added (one-half an equivalent versus the amine titer of the sample). The mixture is agitated and heated under a nitrogen blanket to 80°-90° C. until the chloride titer reaches the expected range. At this point, the reaction product is a mixture which contains unreacted copolymer of VP with 2.5 mole percent amine groups (I), and a 2.5 mole percent of the following reaction product (III):

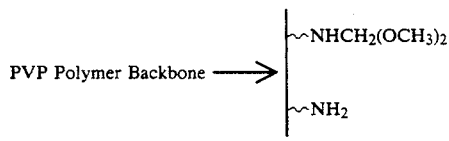

This (III) mixture is stable at a pH above 7.

Step (b)

The stable, basic solution formed in Step (b) above then is acidified with an HCl solution until the pH drops to 5. Upon acidification, the acetal group grafted onto the PVP polymer backbone (III) is hydrolyzed to form pendant aldehyde groups (IV).

Step (c)

The acidified solution from Step (b) is made basic and then condenses with free amino-functional groups present on the polymer chain in solution to form the desired crosslinked product (V) as an aqueous gel or solution.

2. "Addition" Embodiment

In accordance with another embodiment of the invention, the so-called "addition" method, substantially equivalent amounts of (I) and (II) are condensed in step (b) leaving no free amine group in the resultant stable, basic polymer solution containing crosslinkable intermediate (III). This solution then can be crosslinked with a predetermined amount of added (I), followed by acidification step (b) and basic crosslinking (c), as before, to effect the desired crosslinking reaction. The product is crosslinked PVP as a gel or solution.

APPLICATIONS OF CROSSLINKED PVP GEL PRODUCT OF INVENTION

The crosslinked pvp polymer of the invention, in solution or gel form, is used in such commercial applications as a controlled release media for pharmaceuticals, for bandages and wound dressings, for growth of cells, as an artificial skin or skin coating, and as an electrolead on a conductive foil backing.

While the invention has been described with particular reference to certain embodiments thereof, it will be understood that changes and modifications may be made which are within the skill of the art.

Accordingly, it is intended to be bound only by the following claims, in which: what is claimed is:

1. A method of making a crosslinked PVP polymer which comprises:

providing an amino-, an amino alkyl acrylamide or methacrylamide or hydroxy-functional PVP copolymer starting material by copolymerizing vinyl pyrrolidone and an olefinic amine, an amino alkyl acrylamide or methacrylamide or a hydroxy alkene, then (a) condensing predetermined amounts of the starting material and a haloacetal compound in a basic aqueous, alcoholic or aqueous-alcoholic solution to form a stable, crosslinkable, PVP polymer having acetal groups on the PVP polymer backbone, (b) acidifying the basic solution to hydrolyze the acetal groups on the PVP into pendant aldehyde groups, and (c) crosslinking said pendant aldehyde group under basic conditions with amino groups on a PVP polymer chain to form a crosslinked PVP product.

2. A method according to claim 1 wherein said amino-functional PVP copolymer starting material is a copolymer of VP and allyl amine, allyl alcohol, or N-(3-aminopropyl)acrylamide or methacrylamide.

3. A method according to claim 1 wherein said haloacetal compound is chloroacetaldehyde dimethylacetal.

4. A method according to claim 1 wherein less than one equivalent of the haloacetal per starting material is used.

5. A method according to claim 1 wherein substantially equivalent amounts of starting material and haloacetal are used.

* * * * *